US006952843B2

(12) United States Patent
Dunnett

(10) Patent No.: US 6,952,843 B2
(45) Date of Patent: Oct. 11, 2005

(54) OVERFLOW SYSTEM FOR BATHTUB OR OTHER RECEPTACLE

(76) Inventor: Andrew Peter Dunnett, Goodworth Clatford Cottage, Goodworth Clatford, Andover, Hampshire (GB), SP11 7RN ( * ) Notice: Subject to any disclaimer, the term of this patent is extended or adjusted under 35 U.S.C. 154(b) by 122 days.

(21) Appl. No.: 10/476,551

(22) PCT Filed: May 8, 2002

(86) PCT No.: PCT/GB02/02136
§ 371 (c)(1),
(2), (4) Date: Oct. 31, 2003

(87) PCT Pub. No.: WO02/092923
PCT Pub. Date: Nov. 21, 2002

(65) Prior Publication Data
US 2004/0133974 A1 Jul. 15, 2004

(30) Foreign Application Priority Data

| May 12, 2001 | (GB) | ................................... 0111657 |
| Nov. 9, 2001 | (GB) | ................................... 0126941 |

(51) Int. Cl.[7] ........................... E03C 1/00; F16K 31/00
(52) U.S. Cl. .................................... 4/668; 4/669; 4/694
(58) Field of Search .......................... 4/391, 427, 668, 4/669, 671–674, 679, 680, 682, 694, 695; 137/410, 428

(56) References Cited

U.S. PATENT DOCUMENTS

| 3,559,634 A | * | 2/1971 | Lillywhite | ..................... 4/694 |
| 4,194,252 A | * | 3/1980 | Tsuei | ............................. 4/694 |
| 4,359,065 A | | 11/1982 | Fonseca | |
| 6,732,388 B2 | * | 5/2004 | McKenna | ...................... 4/669 |

FOREIGN PATENT DOCUMENTS

| DE | 589121 C | 12/1933 |
| FR | 824881 A | 2/1938 |
| GB | 2288330 | 10/1995 |
| GB | 2312838 | 11/1997 |
| JP | 55042982 | 3/1980 |
| WO | WO93/09303 | 5/1993 |
| WO | WO99/11876 | 3/1999 |

* cited by examiner

Primary Examiner—Tuan Nguyen
(74) Attorney, Agent, or Firm—John V. Stewart

(57) ABSTRACT

An overflow system is described for a water receptacle (22) such as bathtub, sink or washbasin having a water tap for connection to a water supply. The system includes sensing means, such as a float (14), for sensing an overflow condition of the receptacle, and a supply valve (65) responsive to the sensing means and arranged to close the water supply to the tap. The supply valve may be hydraulically controllable via a control port (68) thereof. A control valve (59) is provided between the water supply and the control port The control valve is responsive to the sensing means so that upon such an overflow condition it open and the pressure of the water supply is applied to close the supply valve. Thus, there is no need for a supply of electricity.

13 Claims, 7 Drawing Sheets

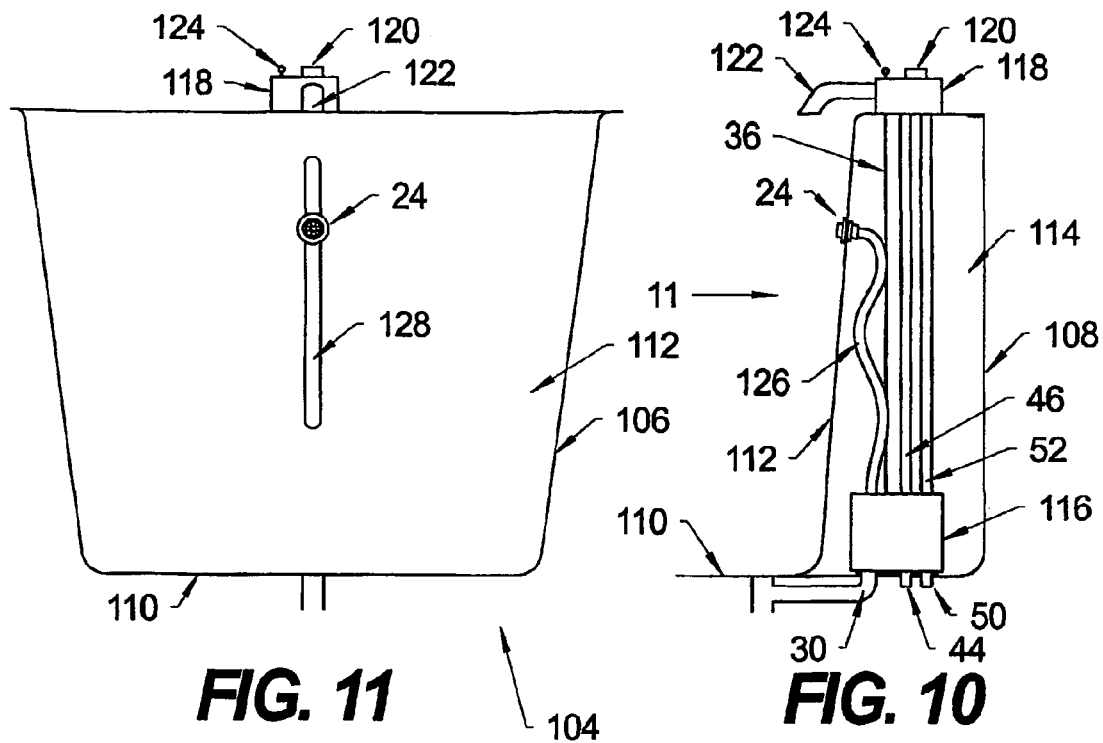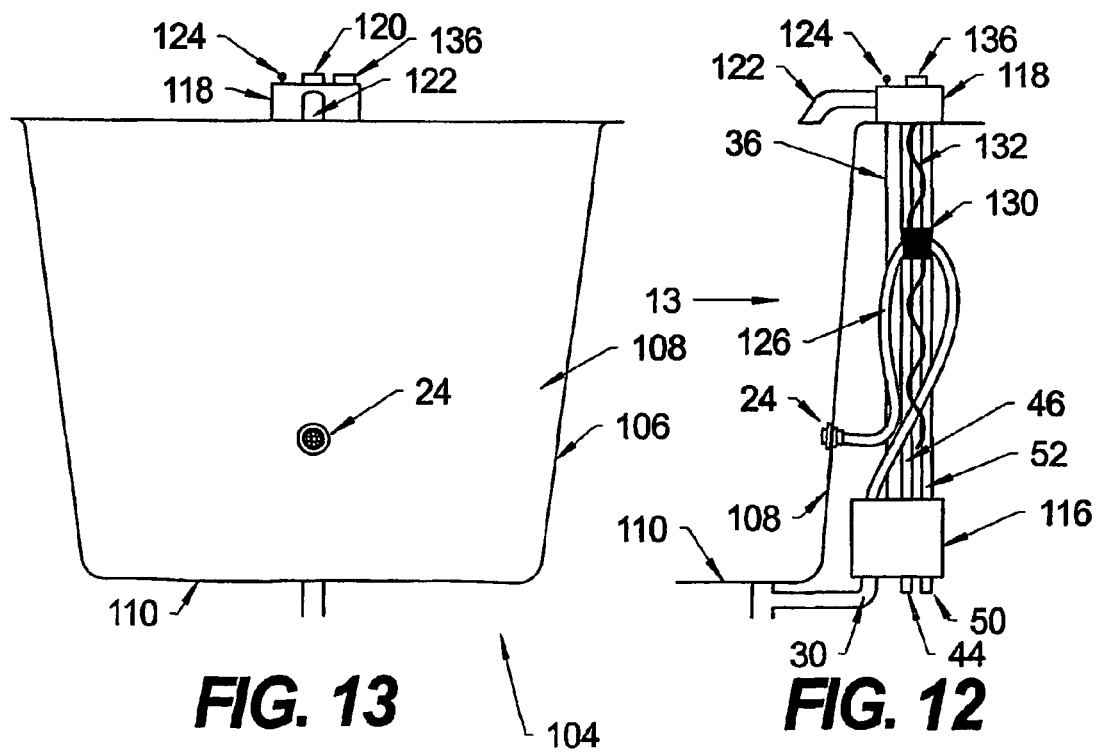

OVERFLOW SYSTEM FOR BATHTUB OR OTHER RECEPTACLE

This invention relates to an overflow system for a water receptacle such as a bathtub, sink or washbasin.

Conventionally, bathtubs, for example, are provided with an overflow outlet at a level near the top of the bathtub, the overflow outlet being connected to the waste pipe leading from the bathtub. Accordingly, once the level of water reaches the overflow outlet, the excess water can drain away to reduce the risk that water will spill over the upper edge of the bathtub and cause a mess and possible damage. Nevertheless, in some cases the overflow cannot cope with the rate of flow required to prevent spillage, for example if the pressure of the water supply to the taps is very high, or if the overflow passageway has become partly or completely blocked. Furthermore, preventing a bathtub from overflowing by draining away the excess water is wasteful of water.

There have been various proposals to deal with these problems. For example, systems are known for automatically opening the normal plug of the bathtub when the water level reaches a predetermined level, but such systems still result in wasted water. Also, electrical systems are known for automatically turning off the supply of water to the bathtub when the water level reaches a predetermined level, but such systems require a supply of electricity and a great amount of care in design and installation to prevent any risk of electrical shock. Furthermore, mechanical systems are known for automatically turning off the supply of water to the bathtub when the water level reaches a predetermined level, but such systems suffer variously from the problems of: bulkiness (e.g. WO99/11876); that they would be difficult to reset when applied to a bathtub (e.g. GB2312838); that reliance is made purely on the buoyancy of a float to provide the motive force to close off the water supply valve(s) (e.g. GB2288330); or that they need to be reset by a mechanism that it may be difficult to make accessible in a bathroom scenario (e.g. WO93/09303).

Simply stated, a first aspect of the invention provides an overflow system that uses the pressure of the water supply to close off the water supply when the bath (or other receptacle) overflows. Thus, there is no need for a supply of electricity, and reliance is not made purely on the buoyancy of a float to provide the motive force to close off the water supply.

Alternatively stated, the first aspect of the invention provides an overflow system for a water receptacle such as a bathtub, sink or washbasin for connection to a water supply, the system including sensing means for sensing an overflow condition of the receptacle, and a supply valve responsive to the sensing means and arranged to close the water supply, characterised in that the supply valve is hydraulically controllable via a control port thereof, a control valve is provided between the water supply and the control port, and the control valve is responsive to the sensing means so that upon such an overflow condition the control valve opens and the pressure of the water supply is applied to the control port of the supply valve to close the supply valve.

(As used above, the phrase "close the water supply" is not intended to imply that the water supply is completely closed off.)

Preferably, the supply valve comprises a plunger movable between a closed position in which a first end of the plunger closes the water supply and an open position in which the first end of the plunger opens the water supply, the second end of the plunger being exposed to the pressure applied to the control port. In this case, the cross-sectional area of the first end of the plunger exposed to the pressure of the water supply is preferably less than the cross-sectional area of the second end of the plunger exposed to the pressure applied to the control port, so as to provide a form of hydraulic amplification.

In the case where the system is for use with such a water receptacle connected to a second water supply (e.g. hot-water supply), preferably the system further includes a second supply valve arranged to close the second water supply, the second supply valve being hydraulically controllable via a control port thereof (which may be shared in common with the first supply valve), the control valve also being provided between the first-mentioned water supply and the control port of the second supply valve so that upon opening of the control valve the pressure of the first water supply is applied to the control port of the second supply valve to close the second supply valve. In some cases, the pressure of the cold-water supply is greater than the pressure of the hot-water supply, and in these circumstances it is preferably the cold-water supply that feeds the control valve.

In the case where the system is for use with such a receptacle having a (conventional) overflow outlet, preferably the system further includes: an actuating element for operating the control valve, the actuating element being held in a first position before such an overflow condition and moving from the first position to a second position upon such an overflow condition; and a manually-operable resetting element for moving the actuating element back from the second position to the first position, the resetting element projecting through or being accessible through the overflow outlet. Accordingly, there is no need to make an additional hole in the wall of the bathtub, or to make a hole in the bath surround, in order to provide access to the resetting element.

Preferably, the system further comprises a detent element for holding the actuating element in the first position, and the sensing means comprises a float for floating on water that has escaped through the overflow outlet and arranged to release the detent element upon rising of the float.

The resetting feature mentioned above may also be applied to other forms of overflow system, such as the electrically-powered or float-powered systems acknowledged above, with similar advantages. Accordingly, a second aspect of the invention provides an overflow system for a water receptacle such as a bathtub, sink or washbasin having an overflow outlet and being for connection to a water supply, the system including sensing means for sensing an overflow condition of the receptacle, and being changeable in response to such an overflow condition from a first state in which the supply is open and a second state in which the supply is closed, and the system further including a manually-operable resetting element for changing the system back from the second state to the first state, characterised in that the resetting element projects through or is accessible through the overflow outlet. Again, there is no need to make an additional hole in the wall of the bathtub, or to make a hole in the bath surround, in order to provide access to the resetting element.

In the first or second aspect of the invention, the effective height of the overflow outlet relative to the receptacle may be adjustable. Therefore, the overflow outlet can be set to the level to which it is desired to fill the receptacle and the water supply/ies can be opened. Then, once the water level reaches the set level, the water supply/ies will automatically close. The receptacle can therefore be left unattended to fill to the desired level without any significant waste of water.

This latter feature may also be applied to other forms of overflow cutoff system, such as the electrically-powered or float-powered systems acknowledged above, with similar advantages. Accordingly, a third aspect of the invention provides an overflow system for a water receptacle such as a bathtub, sink or washbasin having an overflow outlet and for connection to a water supply, the system including sensing means for sensing an overflow condition of the receptacle in which water flows into the overflow outlet, and means for closing the water supply in response to such an overflow condition, characterised in that the effective height of the overflow outlet relative to the receptacle is adjustable.

In one embodiment, the height of an entrance into the overflow outlet is adjustable, and in another embodiment, the height of an overflow passageway leading from the entrance into the overflow outlet is adjustable.

A fourth aspect of the invention provides a water receptacle, such as a bathtub, sink or washbasin, having an overflow system according to the first, second and/or third aspect of the invention.

Specific embodiments of the present invention will now be described, purely by way of example, with reference to the accompanying drawings, in which:

FIG. 10 is a schematic sectioned side view of the tap end of a bathtub having another modified plumbing unit;

FIG. 11 is a view of the end of the bath in the direction 11 marked in FIG. 10;

FIG. 12 is similar to FIG. 10 but showing a further modification; and

FIG. 13 is a view of the end of the bath in the direction 13 marked in FIG. 12.

Figures 1, 2:
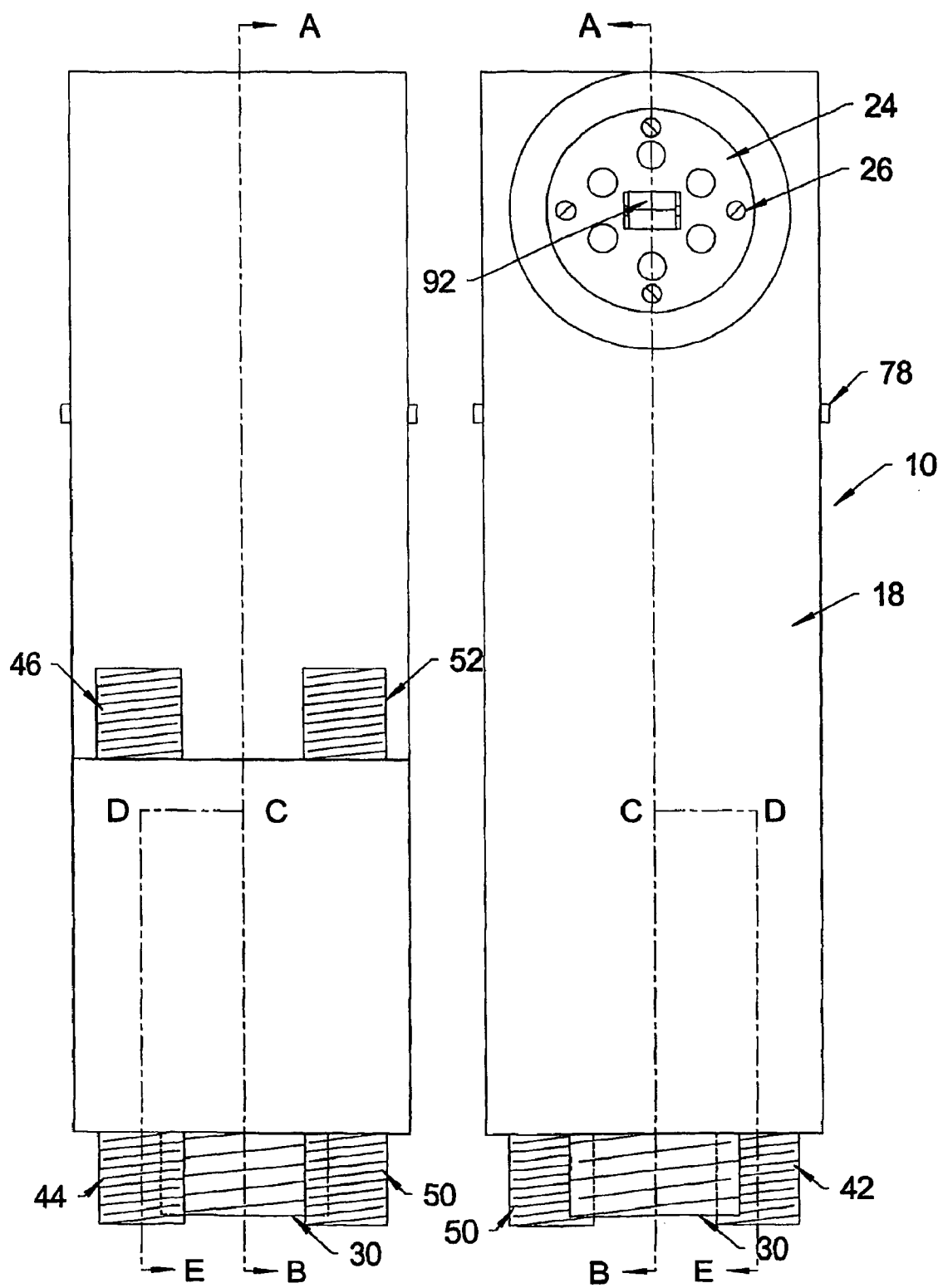
FIG. 1 is a front view of a plumbing unit.
FIG. 2 is a rear view of the plumbing unit.

Referring to the FIGS. 1 to 8 of the drawings, the plumbing unit has a housing 10 which, for simplicity, is shown in the drawings as a single element, but which in practice would be built up from a number of components assembled together. The upper end of the housing 10 provides a float chamber 12 containing a vertically movable toroidal float 14. A short pipe 16 projects from the front wall 18 of the float chamber 12, near the upper end of the float chamber 12, and passes through an overflow hole 20 in the wall 22 of a bathtub. The housing 10 is held in place by a perforated rosette 24 that is attached to the pipe 16 by screws 26. Accordingly, when the water in the bathtub reaches the overflow level, it can pass through the rosette 24 and the pipe 16 into the float chamber 12 causing the level of the float 14 to rise.

Beneath the float chamber 12, the housing 10 provides an outlet chamber 28. The lower end of the outlet chamber has a short pipe 30 that in use is connected to an overflow pipe leading to the bath waste. A valve hole 32 is formed in the dividing wall between the float chamber 12 and the outlet chamber 28, and the valve hole 32 is normally closed by a valve member 34 mounted on a vertically moveable actuating rod 36. The valve member 34 and valve hole 32 together form an "overflow release valve" 38.

A valve block 40 is provided in, and to the rear of, the outlet chamber 28. The valve block 40 provides: a cold-water passageway 42 between a cold water inlet connector 44 (for connection to a cold water supply) and a cold water outlet connector 46 (for connection to a cold tap for filling the bathtub); and a hot-water passageway 48 between a hot water inlet connector 50 (for connection to a hot water supply) and a hot water outlet connector 52 (for connection to a hot tap for filling the bathtub). A control-supply passageway 54 branches within the valve block 40 from the cold-water passageway 42 to a valve hole 56. The valve hole 56 is normally closed by a valve member 58 also mounted on the actuating rod 36. The valve member 58 and valve hole 56 together form a "control valve" 59. Valve passageways 60,62 also branch within the valve block 40 from the cold-water passageway 42 and hot-water passageway 48 respectively. The cold-valve passageway 60 is downstream of the control-supply passageway 54, and both valve passageways 60,62 are of the same diameter as the cold-water and hot-water passageways 42,48. Plungers 64,66 are slideably mounted in the cold-valve and hot-valve passageways 60,62 respectively. The right-hand end (as viewed in FIGS. 7 and 8) of each plunger 64,66 is hemispherical so that when the plunger is to the left the respective cold-water or hot-water passageway 42,48 is open, and when the plunger is to the right the respective cold-water or hot-water passageway 42,48 is closed (although complete sealing is unnecessary). Thus, each plunger 64,66 and its respective cold-water or hot-water passageway 42,48 form a respective "supply valve" 65,67. The left-hand ends of the plungers 64,66 are exposed to a control chamber 68 formed in the valve block 40 above the control valve 59. The plungers 64,66, and the valve passageways 60,62, are stepped in diameter so that the cross-sectional area of each plunger 64,66 exposed to the pressure in the cold-water or hot-water passageway 42,48 is less than the cross-sectional area of each plunger 64,66 exposed to the pressure in the control chamber 68. So that the plungers 64,66 do not lock up hydraulically, each valve passageway 60,62 is vented at 70 to the outlet chamber 28 adjacent the step in the passageway 60,62. Also, the actuating rod 36 passes through a hole 72 in the valve block 40 leading to the control chamber 68 with a small clearance to provide a bleed from the control chamber 68 to the outlet chamber 28.

Figure 3:
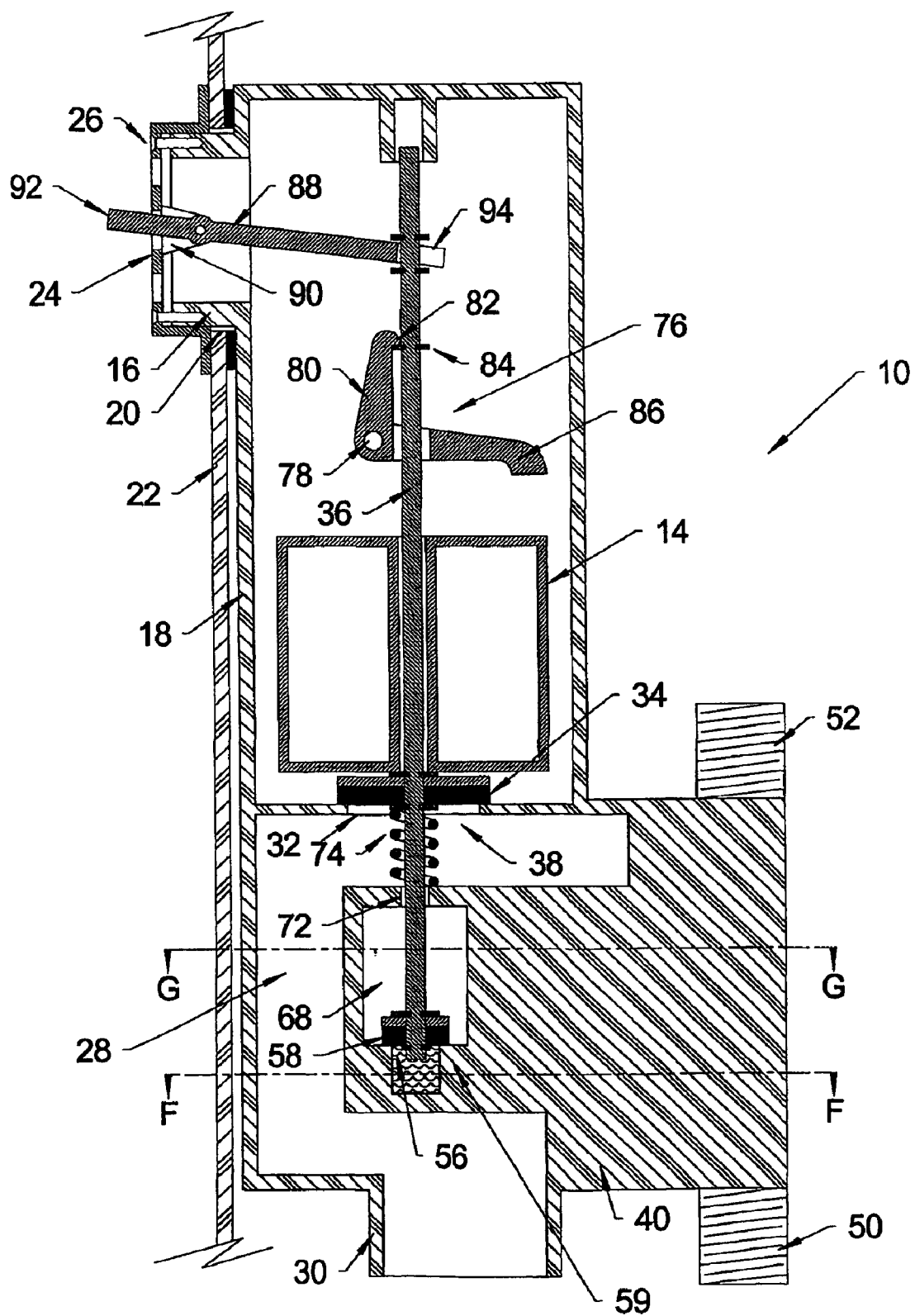
FIG. 3 is a sectioned side view, taken along the section line A–B shown in FIGS. 1 and 2, of the plumbing unit in a first state.

A compression spring 74 is mounted between the valve block 40 and the underside of the overflow release valve member 34 so as urge the actuating rod 36 upwardly. However, the actuating rod 36 is normally held in a lower position (see FIGS. 3 and 4) by a detent mechanism 76 in the float chamber 12. The detent mechanism 76 comprises a crank that is pivoted about a pin 78 extending across the float chamber 12. The crank has a generally vertical arm 80 with a hooked finger 82 that can engage a shoulder or circlip 84 on the actuating rod 36, and a generally horizontal arm 86 that can be engaged by the float 14 when the float rises to pivot the crank (as shown by phantom lines 87 in FIG. 4) and release the finger 82 from the shoulder 84, whereupon the actuating rod 36 rises under the action of the spring 74. In order to return the actuating rod to its lower position, a resetting lever 88 is pivoted to trunnions 90 mounted behind the rosette 24. The left-hand end 92 (as seen in FIG. 3) of the resetting lever 88 projects through a central hole in the rosette 24 and is manually operable. The right-hand end 94 of the resetting lever 88 engages between a pair of shoulders or circlips on the actuating rod 36.

Figure 7:
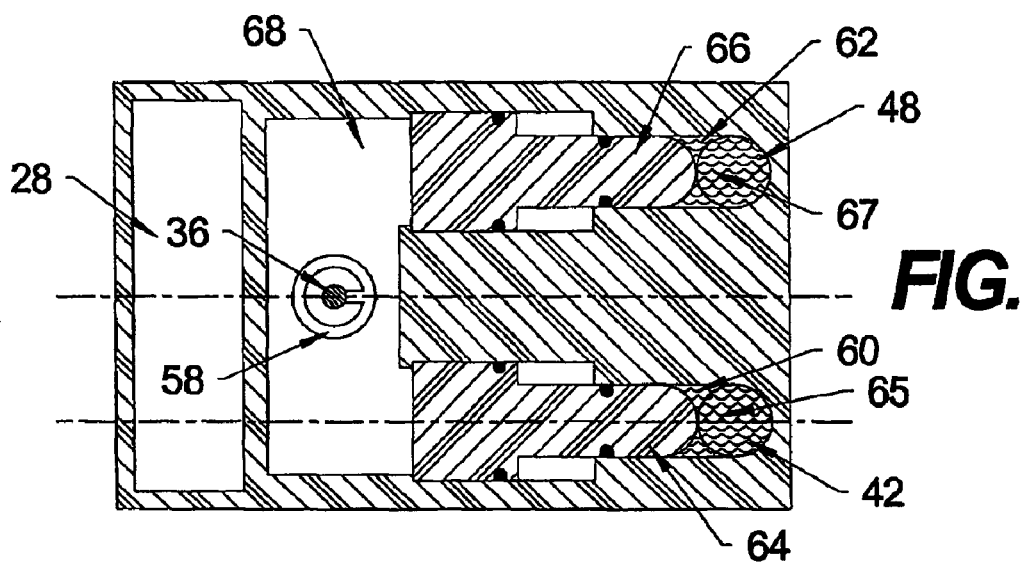
FIG. 7 is a sectioned plan view, taken along the section line G—G in FIG. 3, of the plumbing unit in its first state.

The operation of the plumbing unit will now be described commencing with a first state, as shown in FIGS. 3 and 7, in which the float chamber 12 is empty, the actuating rod 36 is held in its lower position by the detent mechanism 76, the overflow release valve 38 and control valve 59 are closed, and the supply valves 65,67 are open. The bathtub taps can therefore be operated normally to fill the bathtub with cold and hot water flowing through the supply valves 65,67.

Figure 4:
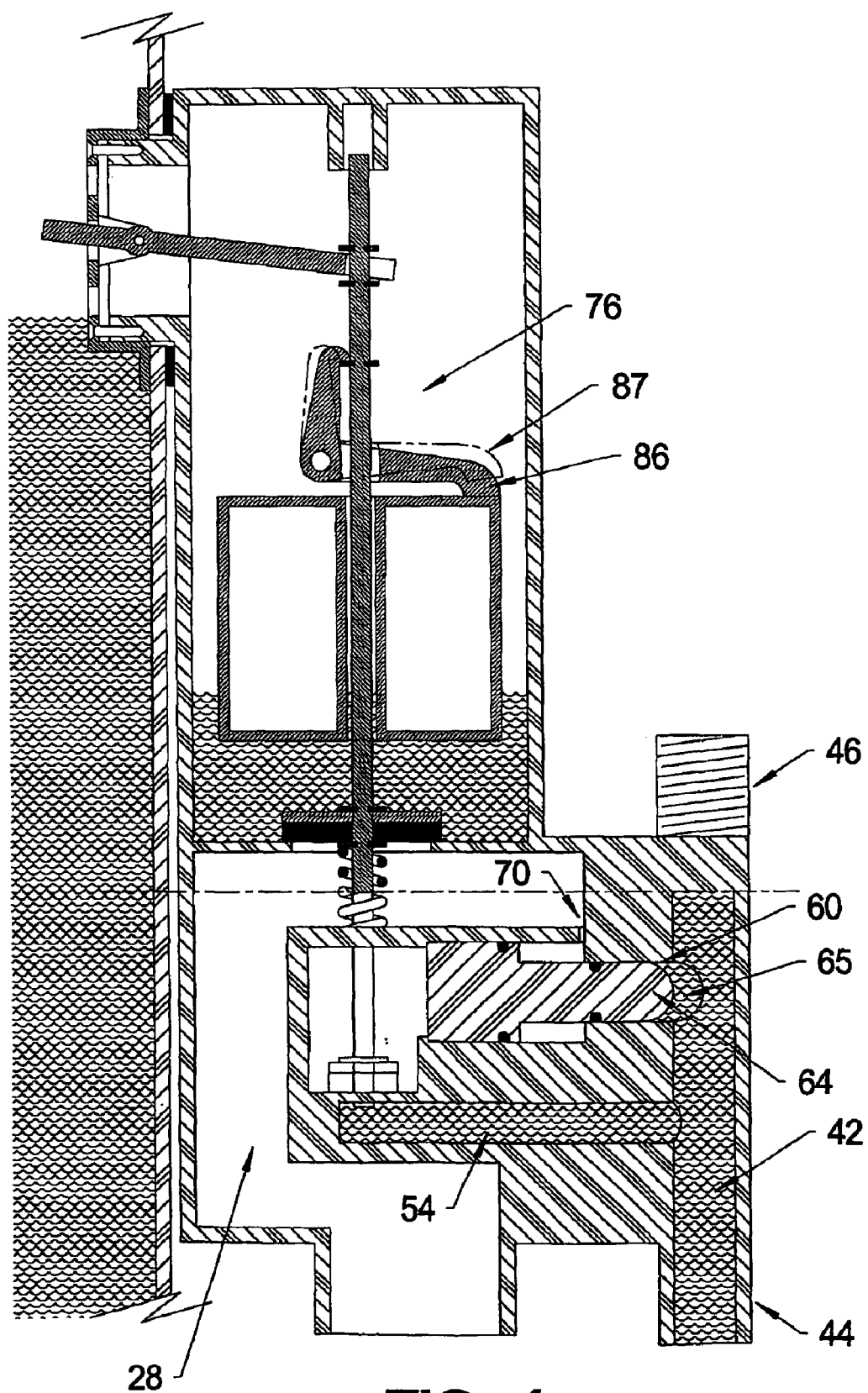
FIG. 4 is a sectioned side view, taken along the section line A–C–D–E shown in FIGS. 1 and 2, of the plumbing unit in a state intermediate its first and second states.
Figure 5:
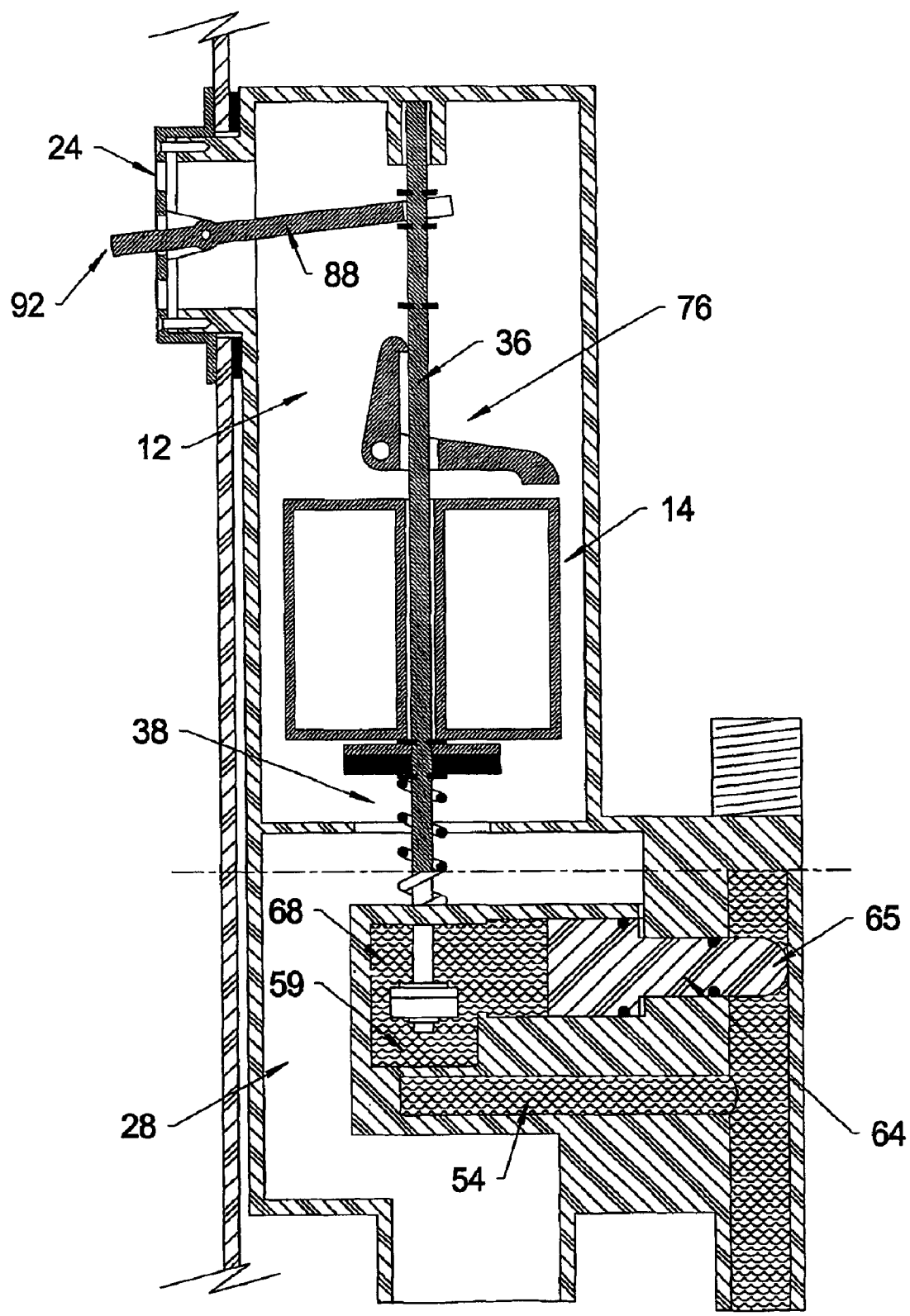
FIG. 5 is similar to FIG. 4, but with the plumbing unit in its second state.
Figure 6:
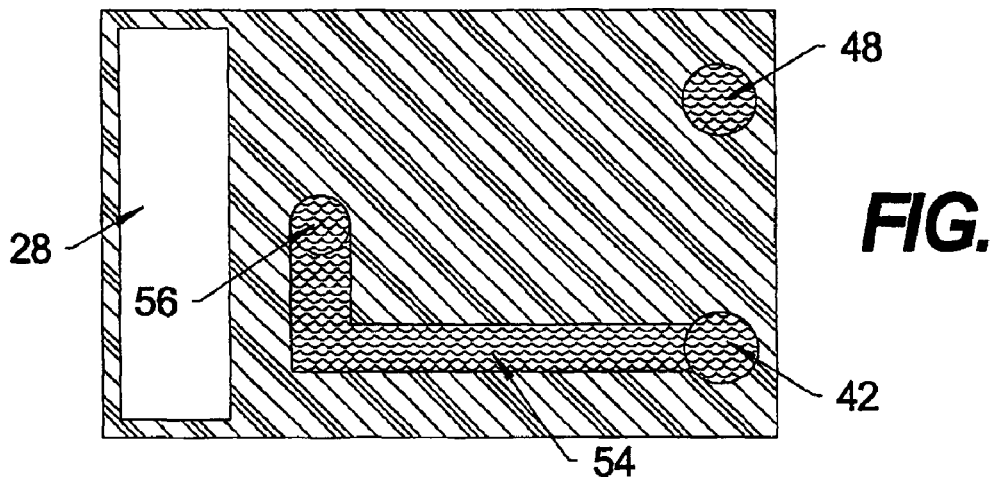
FIG. 6 is a sectioned plan view, taken along the section line F—F in FIG. 3, of the plumbing unit.

If the level of water in the bathtub should rise so that it spills through the rosette 24 into the float chamber 12, the level of the float 14 in the float chamber 12 will rise until it bears against the horizontal arm 86 of the detent mechanism 76, as shown in FIG. 4. Further spillage of water into the float chamber 12 will eventually cause the detent mechanism 76 to trip as shown by the phantom lines 88, so that the actuating rod 36 moves upwardly under the action of the spring 74 to open the overflow release valve 38 and the control valve 59, as shown in FIG. 5.

Once the overflow release valve 38 is open, the water in the float chamber 12 (and any further water that spills into the float chamber 12) can drain to the outlet chamber 28 and thence to the bath waste.

Figure 8:
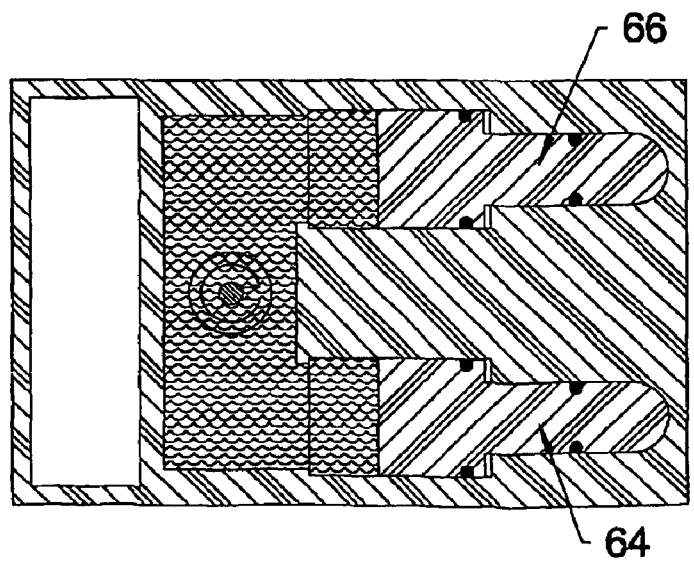
FIG. 8 is similar to FIG. 7, but with the plumbing unit in its second state.

Also, once the control valve 59 opens, water from the cold supply can pass though the control-supply passageway 54 to the control chamber 68. Assuming that the pressure of the hot-water supply is less than or equal to the pressure of the cold-water supply, the pressure of the cold-water supply in the control chamber 68 will apply forces to the right on the left-hand ends of the plungers 64,66 that are greater than the forces applied to the left on the right-hand ends of the plungers 64,66 by the pressures of the cold-water supply and hot-water supply, respectively, due to the stepping of the plungers 64,66 and passageways 60,62. Accordingly, the plungers 64,66 move to the right to close the cold and hot supply valves 65,67 as shown in FIGS. 5 and 8, so that further filling of the bathtub from the cold-water and/or hot-water supplies is prevented or severely curtailed. It should be noted that if the cold and hot supply valves 65,67 do not close completely so that the bathtub continues to overflow slightly, the further overflow water can escape from the float chamber 12 through the open overflow release valve 38 to the outlet chamber 28 and thence to the bath waste.

Furthermore, once the actuating rod 36 moves to its upper position, the resetting lever 88 pivots so that its exposed end 92 moves to a lower position.

When the user of the bathtub returns to find that the bathtub is full and is no longer being filled with cold or hot water, the user can close the cold and hot taps and push the exposed end 92 of the resetting lever 88 upwards so that the actuating rod 36 again becomes held in its lower position by the detent mechanism 76, as shown in FIG. 3. (To assist the detent mechanism 76 in clicking into place, a light spring (not shown) may be provided.) The control valve 59 therefore closes, and the water in the control chamber 68 can bleed through the hole 72 to the outlet chamber 28 so that the pressure in the control chamber 68 can return to atmospheric. The pressure of the water in the control chamber 68 will therefore apply forces to the right on the plungers 64,66 that are less than the forces applied to the left on the plungers 64,66 by the pressures of the cold-water supply and hot-water supply. Accordingly, the plungers 64,66 move to the left to open the cold and hot supply valves 65,67 as shown in FIGS. 4 and 7, so that the bathtub can be filled with water from the cold-water and hot-water supplies upon subsequent opening of the cold and hot taps.

In the arrangements described above, conventional bath taps are provided in addition to the supply valves 65,67. However, in the case when the supply valves 65,67 are manufactured to provide a sufficiently good seal when closed, such conventional bath taps may be omitted. In that case, the plumbing unit would normally be in the state shown in FIG. 5 with both supply valves closed. To fill the bathtub, the waste plug would be fitted to the bathtub, and the lever 88 would be moved to the position shown in FIG. 2, so that the supply valves 65,67 would open and the bathtub would begin to fill. Once the bathtub began to overflow (FIG. 4), the plumbing unit would revert to the state shown in FIG. 5 and the supply valves 65,67 would close. Of course, in order to empty the bathtub, the waste plug would simply be removed. With this modification, an adjustable thermostatic mixer may be provided to vary the proportions of hot and cold water so that the bath water is at a desired temperature. Assuming that the thermostatic mixer is left adjusted to the desired temperature, it will therefore be appreciated that filling the bathtub with water of the desired temperature without any significant wastage of water merely entails fitting the waste plug to the waste outlet of the bathtub and pushing up the end 92 of the lever 88.

Figure 9:
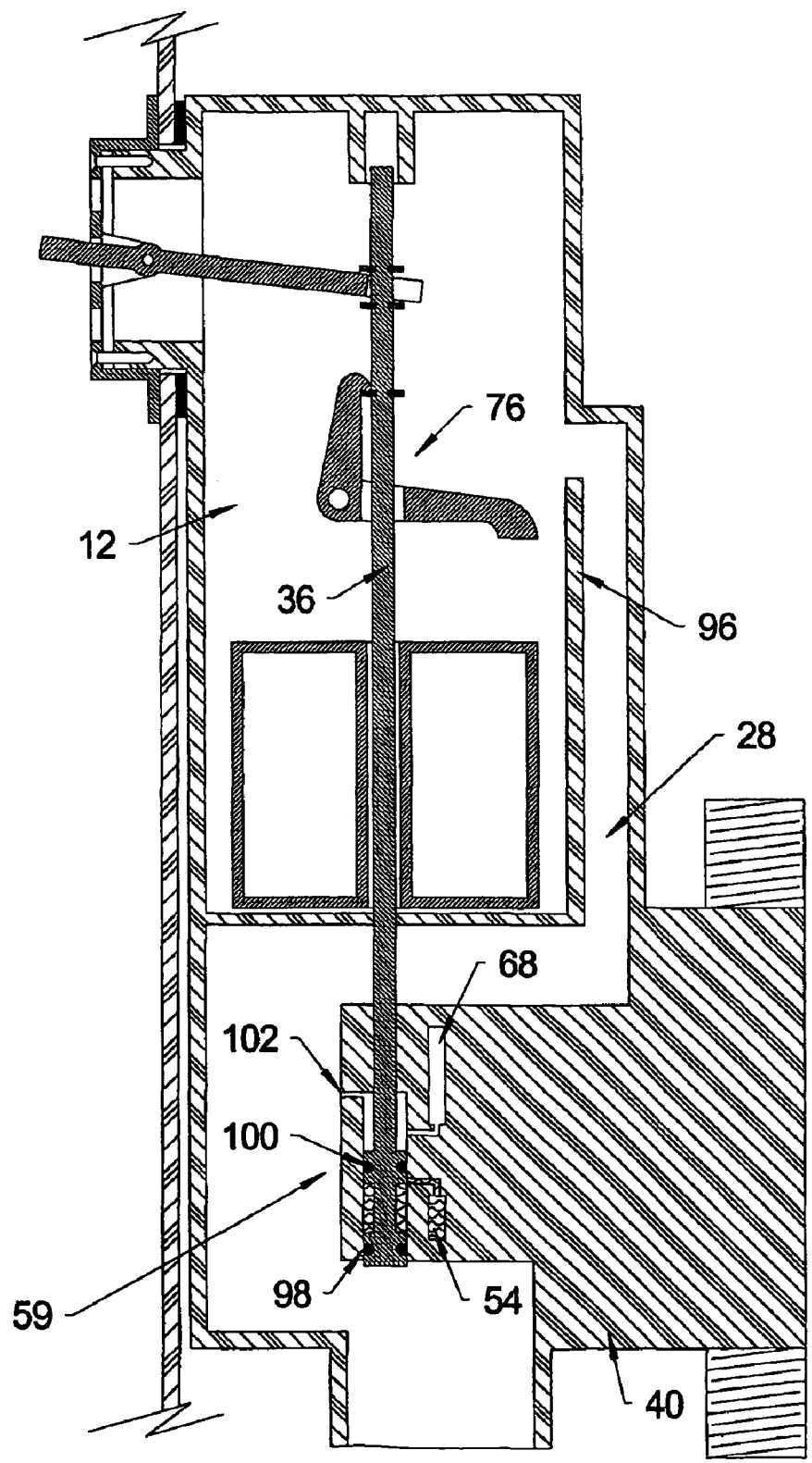
FIG. 9 is similar to FIG. 3, but showing a modified plumbing unit.

Many modifications and developments may be made to the embodiment of the invention described above. For example, FIG. 9 is a view similar to FIG. 3, but of a modified plumbing unit. The unit of FIG. 9 does not have an overflow release valve. Instead, water can pass from the float chamber 12 to the outlet chamber 28 by overflowing a weir 96 at a level higher than the water level in the float chamber 12 required to trip the detent mechanism 76. Accordingly, even if the detent mechanism 76 fails to operate, overflow water can still pass from the float chamber 12 to the outlet chamber 28.

The unit of FIG. 9 also has a modified control valve 59 formed by a pair of raised, spaced-apart seals 98,100 at the lower end of the actuating rod 36 slideable in a bore in the valve block 40. In the position of the actuating rod 36 shown in FIG. 9, the flow of water from the control-supply passageway 54 to the control chamber 68 is blocked, but the control chamber 68 is vented via a bleed passageway 102 to the outlet chamber 28. Once the detent mechanism 76 trips, the actuating rod 36 is moved upwardly by a spring (not shown) so that the control valve 59 connects the control-supply passageway 54 to the control chamber 68 to close the supply valves 65,67, and so that the communication between the control chamber 68 and the bleed passageway 102 is blocked. Accordingly, by comparison with the embodiment of FIGS. 1 to 8, the actuating rod 36 does not receive any net axial force from the water supply that might interfere with the operation of the detent mechanism 76. Furthermore, when the detent mechanism 76 has tripped, water cannot bleed from the control chamber 68 to the outlet chamber 28.

Referring now to FIGS. 10 and 11, a bathtub 104 is shown having side walls 106, end walls 108 and a bottom wall 110 for containing water. A "false" end wall 112 is also provided, spaced from one of the end walls 108 to form a cavity 114. Inside the cavity 114, a plumbing unit 116 similar to that described above is fitted to the bottom wall 110 of the bathtub 104 with the hot and cold inlet connectors 44,50 and the waste connector 30 protruding through sealed holes in the bottom wall 110. A thermostatic mixer 118 with an temperature adjustment knob 120 is fitted on a platform at the top of the false wall 112 and is connected to the hot and cold outlet connectors 46,52 of the plumbing unit 116. The thermostatic mixer 118 has an outlet spout 122 overhanging the bathtub. Unlike the plumbing unit of FIGS. 1 to 9, in FIGS. 10 and 11 the actuating rod 36 projects upwardly from the plumbing unit 116 and passes through the body of the thermostatic mixer 118 to an operating knob 124. Also, unlike the plumbing unit of FIGS. 1 to 9, in FIGS. 10 and 11 the overflow rosette 24 is connected to the plumbing unit 116 by a flexible hose 126. As can be seen in FIG. 11, the overflow rosette is mounted in a vertical slot 128 in the false wall 112 for sliding movement to adjust the height of the rosette 24, and therefore the level at which the bathtub overflows, and therefore the level at which the plumbing unit 116 cuts off the water supplies. The rosette 24 is held in the selected position along the slot 128 by any suitable means.

FIGS. 12 and 13 show a modification to the arrangement of FIGS. 10 and 11. In FIGS. 12 and 13, the bathtub 104 does not have a false wall, and the rosette 24 is fitted in the end wall 108 of the bathtub at a far lower fixed level than is conventional. The flexible hose 126 has a large amount of slack between the rosette 24 and the plumbing unit 116 and passes through a block 130 that is a sliding fit on the hot and cold outlet connectors 46,52. A large-pitched screw 132 depends from the housing of the thermostatic mixer 118 and screw-threadedly engages the block 130. A further knob 136 is provided on the housing of the thermostatic mixer 118 that can be rotated to turn the screw 132 and thus adjust the height of the block 130 and therefore the height of the loop in the hose 126. In order to prevent siphoning, a flexible vent hose (not shown) branches from the hose 126 within the block 130 and has its other open end fixed in a position underneath the thermostatic mixer 118. Accordingly, although the height of the overflow rosette 24 is fixed, the "effective height" of the overflow outlet (i.e. the height of the top of the loop in the hose 126) is adjustable to adjust the height to which the bathtub 104 fills before the plumbing unit 116 cuts off the water supply.

The arrangement of FIGS. 12 and 13 may be modified to employ other means for adjusting the height of the top of the loop in the hose 126. Also, an indicator may be provided to indicate to the user the height to which the system has been set.

The arrangements of FIGS. 10 to 13, and also of FIGS. 1 to 9 insofar as the resetting lever 88 is concerned, may be modified to employ electrically-powered or float-powered valves that are known per se, rather than the hydraulically-powered valves of FIGS. 1 to 9.

It should be noted that the embodiments of the invention have been described above purely by way of example and that many other modifications and developments may be made thereto within the scope of the present invention.

What is claimed is:

1. An overflow system for a water receptacle (22) such as a bathtub, sink or washbasin having an overflow outlet (20) and being for connection to a water supply, the system including sensing means (14) for sensing an overflow condition of the receptacle, and being changeable in response to such an overflow condition from a first state in which the supply is open and a second state in which the supply is closed, and the system further including a manually-operable resetting element (88) for changing the system back from the second state to the first state, characterised in that the resetting element projects (at 92) through or is accessible through the overflow outlet.

2. An overflow system as claimed in claim 1, wherein the effective height of the overflow outlet relative to the receptacle is adjustable.

3. A system as claimed in claim 1, further including a supply valve (65) responsive to the sensing means and arranged to close the water supply, and an actuating system for operating the supply valve, the actuating system being held in a first position before such an overflow condition and moving from the first position to a second position upon such an overflow condition, and the manually-operable resetting element being arranged for moving the actuating system back from the second position to the first position.

4. A system as claimed in claim 1, in combination with a water receptacle (22) having an overflow outlet in which the system is fitted, the resetting element projecting from or being accessible through the overflow outlet.

5. An overflow system for a water receptacle (22) such as a bathtub, sink or washbasin having an overflow outlet (20) and for connection to a water supply, the system including sensing means (14) for sensing an overflow condition of the receptacle in which water flows into the overflow outlet, and means for closing the water supply in response to such an overflow condition, characterised in that the effective height of the overflow outlet relative to the receptacle is adjustable.

6. A system as claimed in claim 5, wherein the height of the entrance (24) into the overflow outlet is adjustable.

7. A system as claimed in claim 5, wherein the height of an overflow passageway (126) leading from the entrance into the overflow outlet is adjustable.

8. An overflow system for a water receptacle (22) such as a bathtub, sink or washbasin for connection to a water supply, the system including sensing means (14) for sensing an overflow condition of the receptacle, and a supply valve (65) responsive to the sensing means and arranged to close the water supply, characterised in that the supply valve is hydraulically controllable via a control port (68) thereof, a control valve (59) is provided between the water supply and the control port, and the control valve is responsive to the sensing means so that upon such an overflow condition the control valve opens and the pressure of the water supply is applied to the control port of the supply valve to close the supply valve.

9. A system as claimed in claim 8, wherein the supply valve comprises a plunger (64) movable between a closed position in which a first end of the plunger closes the water supply and an open position in which the first end of the plunger opens the water supply, the second end of the plunger being exposed to the pressure applied to the control port.

10. A system as claimed in claim 9, wherein the cross-sectional area of the first end of the plunger exposed to the pressure of the water supply is less than the cross-sectional area of the second end of the plunger exposed to the pressure to the control port.

11. A system as claimed in claim 8, for a water receptacle connected to a second water supply, the system further including a second supply valve (67) arranged to close the second water supply, the second supply valve being hydraulically controllable via a control port (68) thereof, the control valve also being provided between the first-mentioned water supply and the control port of the second supply valve so that upon opening of the control valve the pressure of the first water supply is applied to the control port of the second to close the second supply valve.

12. A system as claimed in claim 8 for a receptacle having an overflow outlet (20), further including: an actuating element (36) for operating the control valve, the actuating element being held in a first position before such an overflow condition and moving from the first position to a second position upon such an overflow condition; and a manually-operable resetting element (88) for moving the actuating element back from the second position to the first position, the resetting element projecting (at 92) through or being accessible through the overflow outlet.

13. A system as claimed in claim 12, further comprising a detent element (76) for holding the actuating element in the first position, and the sensing means comprising a float (14) for floating on water that has escaped through the overflow outlet and arranged to release the detent element upon rising of the float.

\* \* \* \* \*